(12) United States Patent
Overby et al.

(10) Patent No.: US 8,990,437 B2
(45) Date of Patent: Mar. 24, 2015

(54) HDMI NETWORK CONTROL OF A MEDIA CENTER COMPUTING DEVICE

(75) Inventors: Mark A. Overby, Bothell, WA (US); Robert William Chapman, Mountain View, CA (US)

(73) Assignee: Nvidia Corporation, Santa Clara, CA (US)

( * ) Notice: Subject to any disclaimer, the term of this patent is extended or adjusted under 35 U.S.C. 154(b) by 935 days.

(21) Appl. No.: 11/939,521

(22) Filed: Nov. 13, 2007

(65) Prior Publication Data

US 2009/0125642 A1 May 14, 2009

(51) Int. Cl.
*G06F 3/00* (2006.01)
*H04N 5/44* (2011.01)
*H04L 12/28* (2006.01)

(52) U.S. Cl.
CPC .......... *H04L 12/282* (2013.01); *H04L 12/2814* (2013.01); *H04L 12/2836* (2013.01)
USPC .............................................. 710/4; 348/553

(58) Field of Classification Search
CPC ................................ H04N 5/44; H04N 5/445
USPC ............................................................ 710/4
See application file for complete search history.

(56) References Cited

U.S. PATENT DOCUMENTS

2005/0259181 A1* 11/2005 Watanabe ...................... 348/554
2006/0041920 A1* 2/2006 Chaney ........................... 725/117
2006/0209745 A1* 9/2006 MacMullan et al. ........... 370/328
2008/0007616 A1* 1/2008 Baladhandayuthapani 348/14.12
2008/0084834 A1* 4/2008 Stanek ........................... 370/284
2008/0172504 A1 7/2008 Kimura et al.
2008/0192768 A1* 8/2008 Tischer et al. ................ 370/466
2008/0212940 A1 9/2008 Tan et al.

FOREIGN PATENT DOCUMENTS

JP          2008-172637          7/2008
KR         2006-0111701         10/2006
TW             200526037         8/2005

OTHER PUBLICATIONS

English translation of Korean Office Action, Korean Pat. App. No. 10-2008-112350, dated May 31, 2010.

\* cited by examiner

*Primary Examiner* — Titus Wong
(74) *Attorney, Agent, or Firm* — Artegis Law Group, LLP (57) ABSTRACT

A software or hardware agent running on a personal computing (PC) device provides allows a consumer electronic device connected to the PC device over a high definition multimedia interface (HDMI) network to control the PC device using standardized commands. This enables a user to control the PC device and other consumer electronic devices that are connected to the HDMI network using a single interface. The agent responds as a consumer electronic device and translates the standardized commands as universal serial bus (USB) human interface device (HID) input reports to the PC device operating system. The agent represents the specific capabilities of the PC device as standard consumer electronic device controls.

20 Claims, 7 Drawing Sheets

HDMI NETWORK CONTROL OF A MEDIA CENTER COMPUTING DEVICE

BACKGROUND OF THE INVENTION

1. Field of the Invention

Embodiments of the present invention relate generally to a personal computing device that is configured to appear as a consumer electronic device that is controlled by commands received over a high definition multimedia interface (HDMI) network.

2. Description of the Related Art

Currently there is no standard interface for controlling a personal computing device by one or more consumer electronic devices over an HDMI network. Consumer electronic devices provide specific controls for a user, such as fast-forward, skip, stop, and play. Typically, the specific controls vary for different vendors of consumer electronic devices. Without a standard interface, users rely on separate interfaces, such as remote controllers, for each consumer electronics device and any personal computing devices attached to the HDMI network. When multiple consumer electronic devices are connected using an HDMI network, it is desirable to control a computing device, such as a personal computer, using a consumer electronics device that is also connected to the HDMI network.

Accordingly, what is needed in the art is a system and method for controlling a personal computing device using a consumer electronic device over an HDMI network.

SUMMARY OF THE INVENTION

A software or hardware agent running on a personal computing device allows a consumer electronic device that is a source to control the personal computing device as a sink using standardized controls over an HDMI network. In particular, the consumer electronic control (CEC) channel that is specified in HDMI 1.2a provides a standard set of controls for consumer electronic devices. The CEC channel allows a user to control multiple consumer electronic devices with a single remote controller and allows consumer electronic devices to control each other. When the software or hardware agent is used, the agent responds as a consumer electronic device and translates the standardized commands as universal serial bus (USB) human interface device (HID) input reports to the operating system running on the personal computing device. The agent represents the specific capabilities of the personal computing device as standard consumer electronic device controls.

Various embodiments of a method of the invention for controlling a personal computing device using standard consumer electronic device commands over a HDMI network include the personal computing device reporting as a consumer electronic device sink to the consumer electronic devices coupled to the computing device over the HDMI network to allow a user to control the computing device over the HDMI network. The personal computing device is configured to receive a control command from a first consumer electronic device of the consumer electronic devices over the HDMI network, translate the control command into a USB HID report, and process the USB HID report to execute the control command.

Various embodiments of the invention for a computing device allow the computing device to be controlled by a consumer electronic device over a HDMI network. The computing device includes an HDMI controller that is coupled to the HDMI network and configured to receive control commands from the consumer electronic device and an agent. The agent is configured to report control capabilities of the computing device to the consumer electronic device as standard consumer electronics control commands, receive a control command from the consumer electronic device over the HDMI network, translate the control command into a USB HID report, and process the USB HID report to execute the control command.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

System Overview

Figure 1A:
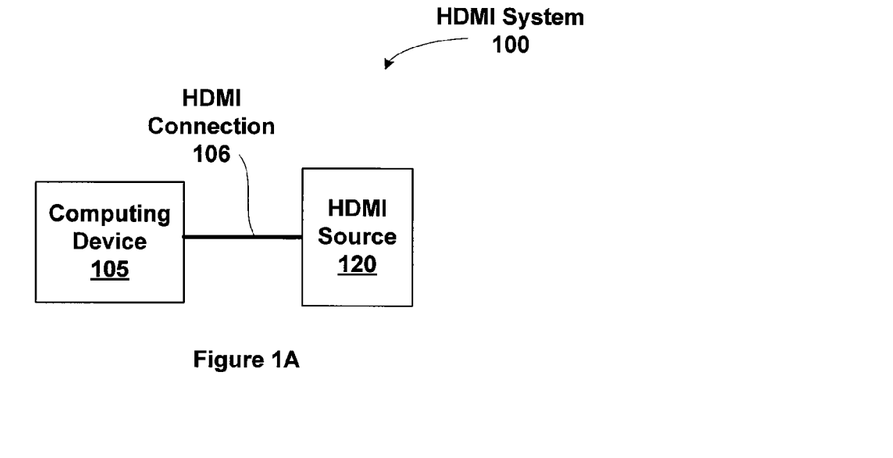
FIGS. 1A and 1B are block diagrams illustrating an HDMI system configured to implement one or more aspects of the present invention.

FIG. 1A is a block diagram illustrating an HDMI system 100 that is configured to implement one or more aspects of the present invention. A computing device 105 is coupled to an HDMI source 120 through an HDMI network, shown as HDMI connection 106. HDMI source 120 is a consumer electronic device that conforms to the HDMI interface protocol and is configured to receive device controlling signals and at least one of audio data, visual data, and multimedia data. Consumer electronic devices include, without limitation, a receiver, digital video disc (DVD) player, HDMI repeater, and television. In the preferred embodiment of the present invention, HDMI source 120 is configured to support the CEC channel to provide a standard audio/visual link protocol. Computing device 105 is described in further detail in conjunction with FIG. 2 and includes, without limitation, a personal computer, desktop computer, server, laptop computer, palm-sized computer, tablet computer, game console, portable wireless terminal such as a PDA or cellular telephone, and computer based simulator.

Figure 1B:
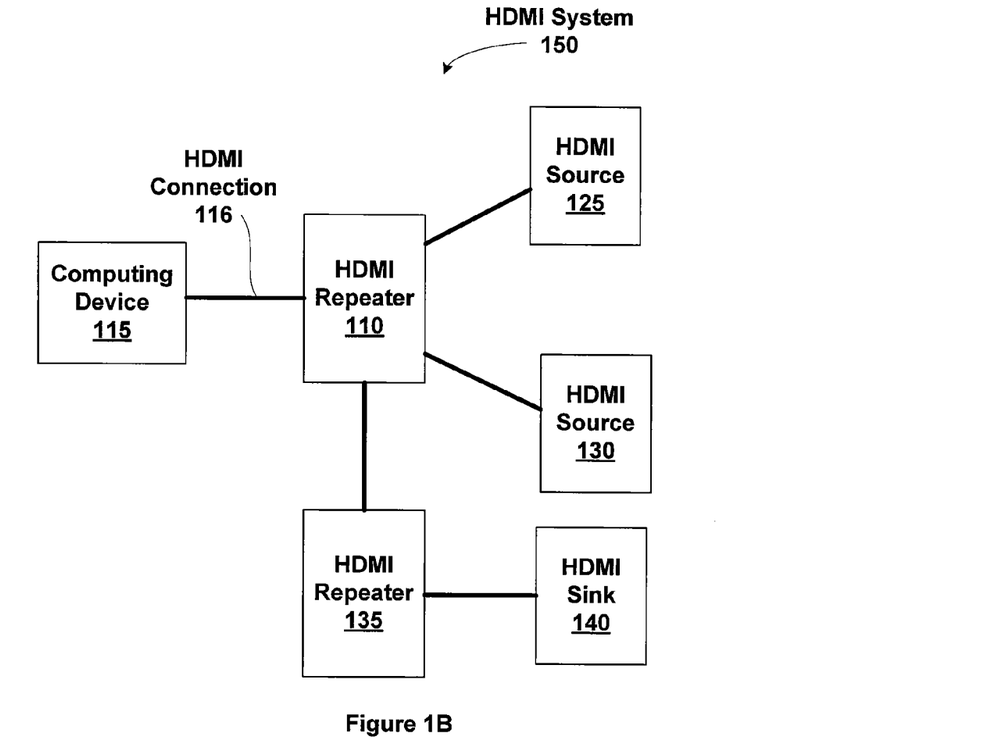

FIG. 1B is a block diagram illustrating another HDMI system, HDMI system 150 that is configured to implement one or more aspects of the present invention. A computing device 115 is coupled to an HDMI repeater 110 through HDMI connection 116. Additional connections couple HDMI repeater 110 to HDMI source 125, HDMI source 130, HDMI repeater 135, and HDMI sink 140. HDMI source 125, HDMI source 130, and HDMI repeater 135 are consumer electronic devices that conform to the HDMI interface protocol and are configured to receive device controlling signals and at least one of audio data, visual data, and multimedia data. In the preferred embodiment of the present invention, HDMI source 125, HDMI source 130, HDMI repeater 135, and HDMI sink 140 are configured to support the CEC channel to provide a standard audio/visual link protocol. HDMI sources 125 and 130 are consumer electronic devices that conform to the HDMI interface protocol and are configured to output multimedia data, and includes, without limitation, digital video disk players, digital cable set top boxes, satellite TV receivers, and the like. In some embodiments of the present invention, HDMI sink 140 is a computing device such as computing device 105 or 115.

Figure 4:
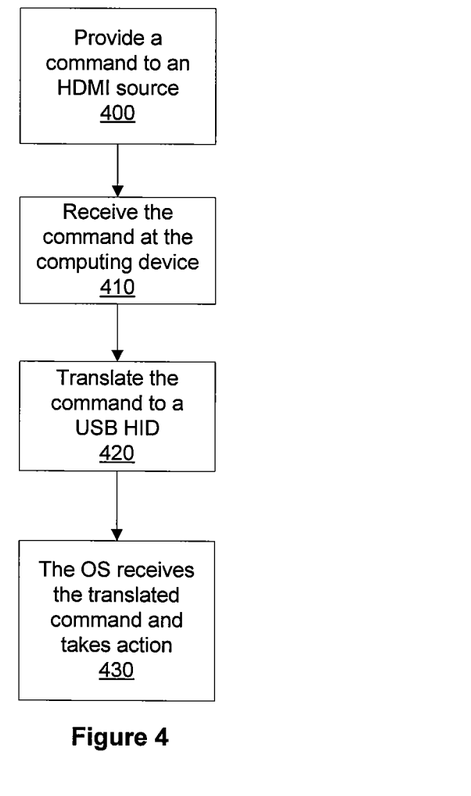
FIG. 4 is a flow diagram of method steps for controlling a computing device within an HDMI system in accordance with one or more aspects of the present invention.
Figure 5:
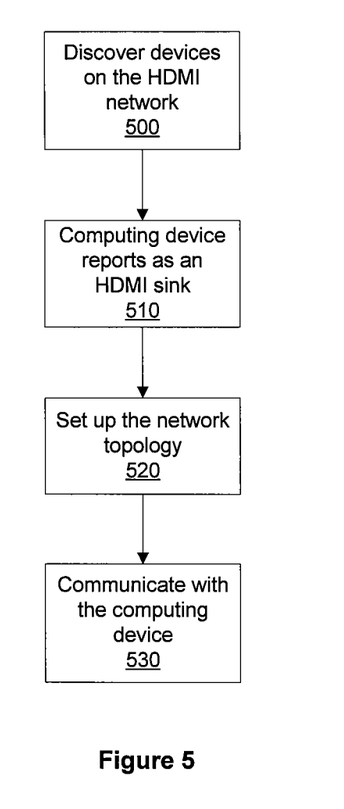
FIG. 5 is a flow diagram of method steps for configuring a computing device for control by an HDMI source device in an HDMI system.

An advantage of using an HDMI network to connect the consumer electronic devices and computing device 105 or 115 rather than a wireless network is that the consumer electronic devices may be hidden within or behind furniture and computing device 105 or 115 may be controlled by the consumer electronic devices through the HDMI connections, as described in conjunction with FIGS. 4 and 5. In some embodiments of the present invention, one or more of HDMI source 125 and 130 is a computing device that is configured as an HMDI source device that can be used to control HDMI sink 140 and/or computing device 115, as described in conjunction with FIG. 6.

In FIGS. 1A and 1B, HDMI sources 125 and 130 are configured to discover all consumer electronic devices in HDMI System 100 and 150, respectively, and set up the HDMI network topology. Each consumer electronic device and computing device 105 or 115 coupled to the HDMI network reports its control capabilities, such as CEC channel commands, to HDMI source 120, 125, and 130 using a standardized method of communicating status and control points. Application programs running on HDMI source 120, 125, and 130 can interact with and control the consumer electronic devices and computing devices 105 and 115 using the standardized controls.

As previously mentioned, a software or hardware agent within computing device 105 and 115 translates between USB and standardized controls, such as CEC channel commands. Computing device 105 and 115 can each be advantageously controlled by HDMI source 120 and HDMI sources 125 and 130, respectively, rather than relying on a dedicated control mechanism, e.g., remote control, for each one of the consumer electronic devices and computing devices 105 and 115. Although a programmable universal remote control may be used, each different consumer electronic device and computing devices 105 and 115 is controlled by configuring the programmable universal remote control to enter a different mode for each device. Furthermore, the programmable universal remote control does not allow for the devices being controlled to be hidden.

Figure 2:
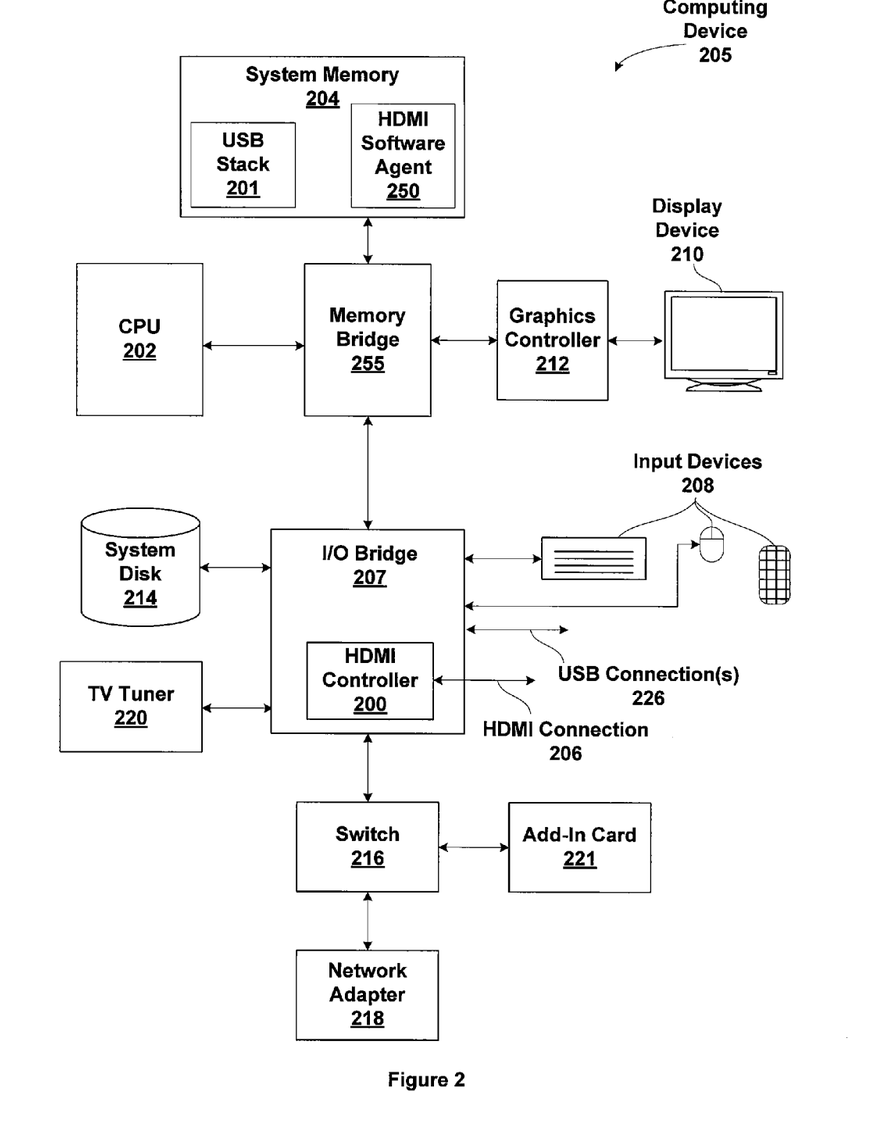
FIG. 2 is a block diagram illustrating the computing device of FIGS. 1A and 1B configured to implement one or more aspects of the present invention.

FIG. 2 is a block diagram illustrating a computing device 205 that is configured to implement one or more aspects of the present invention. Computing device 205 represents either of computing devices 105 and 115, and includes a central processing unit (CPU) 202 and a system memory 204 communicating via a bus path that includes a memory bridge 255. System memory 204 may include dynamic random access memory (DRAM) or any other appropriate memory technology. Data and program instructions for application programs may be stored in system memory 204 or memory within other devices of system computing device 205. A USB stack 201 is provided as part of a conventional operating system and is executed by CPU 202 to process transactions over USB connection 226. HDMI software agent 250 is configured to interface between consumer electronic devices connected via HDMI connection 206 and USB stack 201, as described in conjunction with FIGS. 3A, 4, 5 and 6. In some embodiments of the present invention, HDMI software agent 250 is omitted and the functions of HDMI software agent 250 are performed by circuitry within HDMI controller 200, i.e., a hardware agent, as described in conjunction with FIG. 3B.

Memory bridge 205, which may be, e.g., a Northbridge chip, is connected via a bus or other communication path, e.g., a HyperTransport link, to an I/O (input/output) bridge 207. A graphics controller 212 is coupled to memory bridge 255 via a bus or other communication path, e.g., a PCI Express, Accelerated Graphics Port, or HyperTransport link; in one embodiment graphics controller 212 is a graphics subsystem that delivers pixels to a display device 210, e.g., a conventional CRT or LCD based monitor.

An I/O bridge 207, e.g., a Southbridge chip, receives user input from one or more user input devices 208 (e.g., computer keyboard, wireless remote control, mouse, joystick, trackball, or capacitive input pad) and forwards the input to CPU 202 via memory bridge 255. A system disk 214 is also connected to I/O bridge 207 and may be used to store data, including multimedia content for output to consumer electronic devices via HDMI connection 206. A TV tuner 220 is coupled to I/O bridge 207 and configured to be controlled by an HDMI source device. TV Tuner and other consumer electronic devices coupled to I/O bridge 207 and switch 216 may be presented by computing device 205 as HDMI devices for control via HDMI connection 206. An HDMI controller 200 is included within I/O bridge 207 and provides circuitry to interface between HDMI connection 206 and USB stack 201, as described in conjunction with FIGS. 3A and 3B.

A switch 216 provides connections between I/O bridge 207 and other components such as a network adapter 218 and various add-in card 221. Other components (not explicitly shown), including other port connections, CD drives, DVD drives, film recording devices, a TV tuner, media storage devices, and the like, may also be connected to I/O bridge 207. Communication paths interconnecting the various components in FIG. 2 may be implemented using any suitable protocols, such as HDMI, USB, PCI (Peripheral Component Interconnect), PCI Express (PCI-E), AGP (Accelerated Graphics Port), HyperTransport, or any other bus or point-to-point communication protocol(s), and connections between different devices may use different protocols as is known in the art.

It will be appreciated that the computing device shown herein is illustrative and that variations and modifications are possible. The connection topology, including the number and arrangement of bridges, may be modified as desired. For instance, in some embodiments, system memory 204 is connected to CPU 202 directly rather than through a bridge, and other devices communicate with system memory 204 via memory bridge 255 and CPU 202. In other alternative topologies, graphics controller 212 is connected to I/O bridge 207 or directly to CPU 202, rather than to memory bridge 255. In still other embodiments, two or more of the system components may be incorporated into a single integrated device. For example, I/O bridge 207 and memory bridge 255 might be integrated into a single chip or CPU 220, system controller 218, graphics controller 212 and network adapter 218 may be incorporated into a single integrated device.

The particular components shown herein are optional; for instance, any number of add-in cards or peripheral devices might be supported. In some embodiments, switch 216 is eliminated, and network adapter 218 and add-in cards 220, 221 connect directly to I/O bridge 207.

Controlling a Computing Device Over an HDMI Network

Figure 3A:
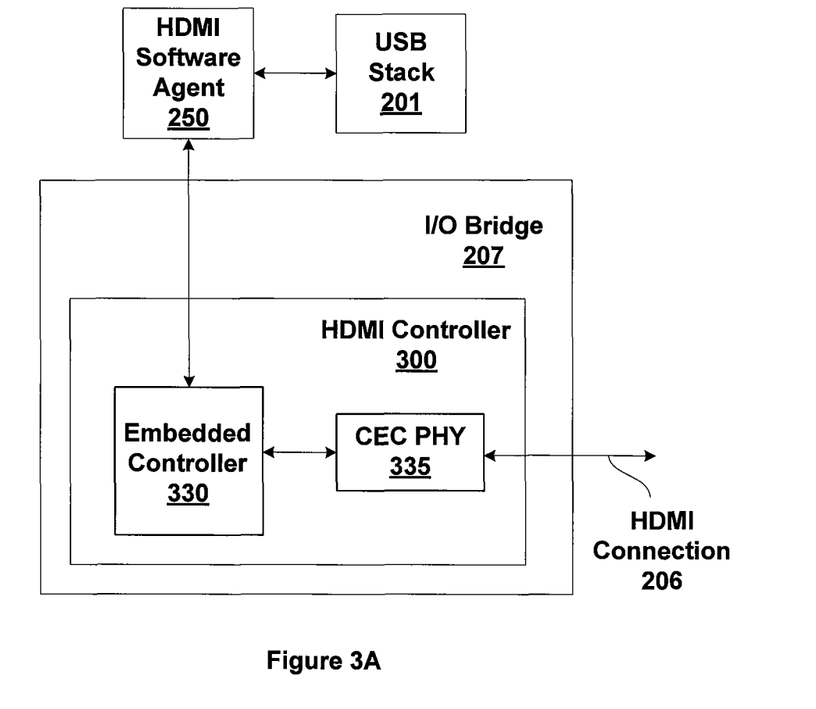
FIG. 3A is a block diagram of a portion of the computing device shown in FIG. 2, including the I/O bridge, HDMI software agent, and USB stack in accordance with one or more aspects of the present invention.

FIG. 3A is a block diagram of a portion of computing device 205 shown in FIG. 2, including I/O bridge 207, HDMI software agent 250, and USB stack 201, in accordance with one or more aspects of the present invention. An HDMI controller 300 includes circuitry for a conventional physical layer, PHY 335 that includes circuitry to interface with HDMI devices via HDMI connection 206. PHY 335 interfaces with an embedded controller 330 that may be implemented using a microprocessor, controller, fixed function logic, or the like. Embedded controller represents the capabilities of the computing device 205 to other devices present on HDMI Connection 206. The capabilities of the computing device 205 are provided to embedded controller 330 via communication with HDMI software agent 250. Once discovery is complete, embedded controller 330 stores any transmission received via PHY 335 into a buffer and alerts HDMI software agent 250 of validity of this data. Embedded controller 330 may also take data from a buffer filled by the HDMI software agent 250 and send this data over HDMI Connection 206 via PHY 335. Typically the transmissions between HDMI software agent 250 and embedded controller 330 will involve standard CEC commands such as fast forward, play, stop, etc.

HDMI software agent 250 presents computing device 205 and any media devices coupled to computing device 205 to HDMI controller 300 as HDMI sink devices, providing a standardized mechanism for controlling computing device 205 as a consumer electronic device. In other embodiments of the present invention, HDMI software agent 250 presents the consumer electronic devices connected to HDMI controller 300 as USB devices to computing device 205, providing a standardized mechanism for controlling each of the consumer electronic devices using computing device 205 configured as an HDMI source device.

HDMI software agent 250 is custom software that advantageously computing device 205 to be controlled by a HDMI source device, e.g., HDMI source 120, 125, or 130, as a HDMI sink device using a conventional operating system including USB stack 201. Computing device 205 emulates a consumer electronic device that is controllable using CEC channel controls via HDMI connection 206. The conventional operating system provides USB stack 201 and HDMI software agent 250 translates CEC channel controls received via HDMI connection 206 into USB HID reports for processing by USB stack 201.

Figure 3B:
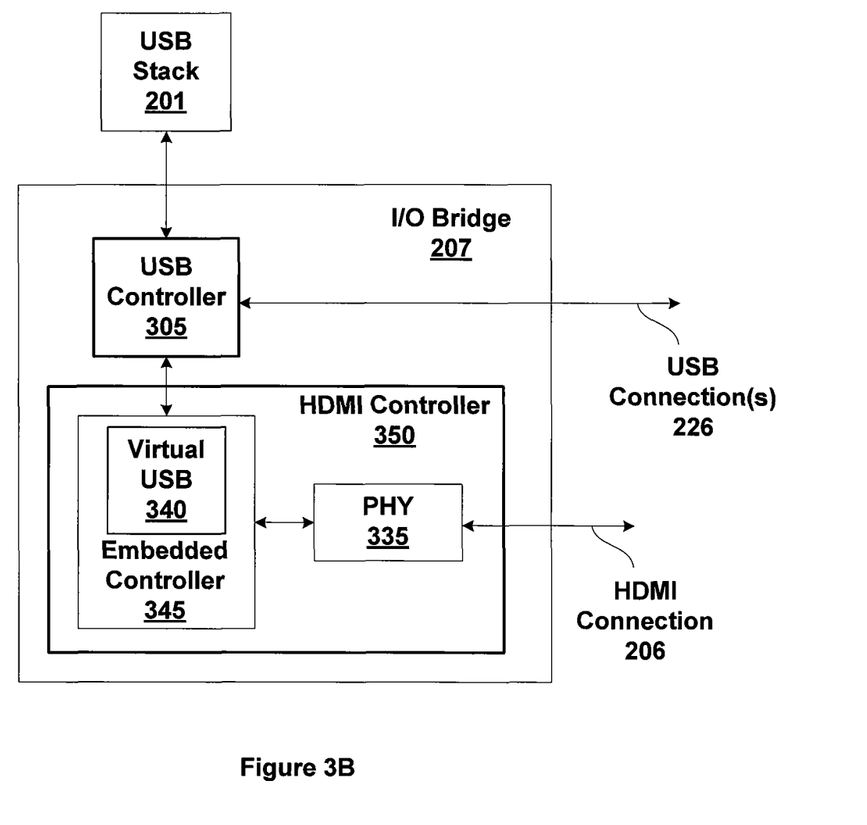
FIG. 3B is a block diagram of a portion of the computing device shown in FIG. 2, including the I/O bridge and USB stack in accordance with one or more aspects of the present invention.

FIG. 3B is a block diagram of a portion of computing device 205 shown in FIG. 2, including I/O bridge 207 and USB stack 201, in accordance with one or more aspects of the present invention. In this embodiment of the present invention, the functionality provided by HDMI software agent 250 is provided by a virtual USB 340 within an embedded controller 345. Like HDMI controller 300, HDMI controller 350 includes PHY 335 to interface with consumer electronic devices via HDMI connection 206. Embedded controller 345 performs the functions of embedded controller 330, and additionally, virtual USB 340 presents the control commands received by PHY 335 via HDMI connection 206 to USB controller 305 as USB HID reports. Conversely, when computing device 205 is configured as an HDMI source device virtual USB 340 presents the controls of sink HDMI network devices connected to HDMI controller 350 to a USB controller 305 as USB HIDs to allow computing device 205 to control those devices. Conventional USB controller 305 provides a USB interface for USB connection(s) 226 and is connected to embedded controller 345 using a USB interface.

Virtual USB 340 appears to USB controller 305 as another USB connection, to which one or more consumer electronic devices are coupled. USB controller 305 interfaces with USB stack 201 to allow an HDMI source device to control computing device 205 via HDMI connection 206. HDMI software agent 250 or virtual USB 340 each emulate the received control commands as USB-based HID reports to allow USB stack 201 to process the control commands. Consumer electronics device control commands that comply with a standard, such as the CEC channel of HDMI 1.3, can be translated by HDMI software agent 250 or virtual USB 340 into USB HID reports and processed by USB stack 201.

FIG. 4 is a flow diagram of method steps for controlling computing device 205 within an HDMI system, in accordance with one or more aspects of the present invention. In step 400 a control command, e.g., play, fast-forward, skip, stop, and the like, specified by a standard such as the CEC channel, is provided to computing device 205 via HDMI connection 206. A user may control one or more of the HDMI networked sink devices through a single input device, e.g., remote control, provided by an HDMI source device. Alternatively, a user may control one or more of the HDMI networked consumer electronic devices (HDMI sinks) through a graphical user interface displayed by an HDMI source device.

In step 410 HDMI controller 350 or 300 receives the control command and in step 420 virtual USB 340 or HDMI software agent 250, respectively, translates the command into a USB HID report for processing by USB stack 201. In step 430 the operating system running on computing device 205 receives the translated command and takes action, i.e., executes the command.

FIG. 5 is a flow diagram of method steps for configuring computing device 205 for control by an HDMI source device in HDMI system 100 or 150, in accordance with one or more aspects of the present invention. In step 500 HDMI source devices 120 or 125 and 130 discover any consumer electronic devices on the HDMI network, i.e., computing device 205 and any consumer electronic devices connected to computing device 205. In step 510 computing device 210 reports as an HDMI sink device. HDMI source devices 120 or 125 and 130 determine the specific control capabilities, e.g., CEC channel controls, that are reported by virtual USB 340 or HDMI software agent 250 for computing device 205 in step 600. For example, computing device 205 and any consumer electronic devices connected to computing device 205 may support one or more of the user commands, e.g., play, fast-forward, skip, stop, and the like, specified by a standard, such as the CEC channel. In step 520 HDMI source devices 120 or 125 and 130 set up the network topology. In step 530 one or more HDMI source devices communicates with computing device 205 as an HDMI sink device to control the capabilities reported by computing device 205.

Virtual USB 340 and HDMI software agent 250 provide a standardized method of communicating CEC channel controls for each control capability that is supported by computing device 205. Therefore, a user may control computing device 205 remotely through a single input device, e.g., remote control, provided by HDMI source device 120, 125, or 130. Alternatively, a user may computing device 205 remotely through a graphical user interface displayed by HDMI source device 120, 125, or 130. Furthermore, since consumer electronic devices are hot pluggable, HDMI source device 120, 125, and 130 detect when computing device 205 or any consumer electronic devices connected to computing device 205 is added or removed from HDMI system 100 or 150 and updates the network topology accordingly.

A Computing Device as an HDMI Source

When computing device 205 is configured as an HDMI source device, USB controller 305 interfaces with USB stack 201 to allow a software application executing on computing device 205 to control the HDMI devices connected via HDMI connection 206. HDMI software agent 250 or virtual USB 340 each emulate the controls of the consumer electronic devices connected via HDMI connection 206 as USB-based human interface devices to allow computing device 205 to behave as an HDMI source device and control other consumer electronic devices over an HDMI network.

Figure 6:
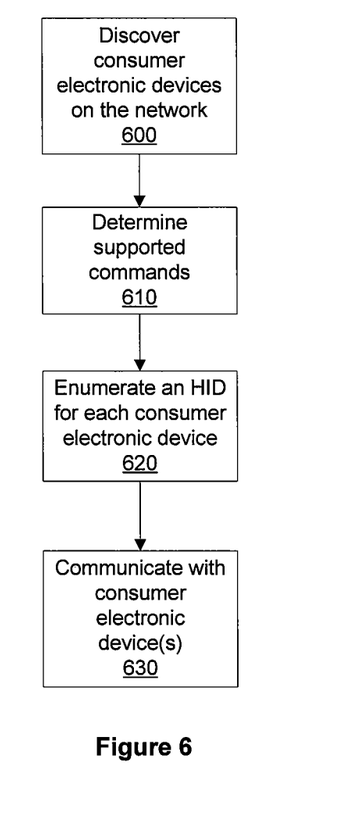
FIG. 6 is a flow diagram of method steps for configuring an HDMI system for control by a computing device, in accordance with one or more aspects of the present invention.

FIG. 6 is a flow diagram of method steps for configuring HDMI system 100 and 150 for control by computing device 205, in accordance with one or more aspects of the present invention. Referring to FIG. 1B, one or more of HDMI sources 125 and 130 may be a computing device 205 that is configured as an HDMI source device. In some embodiments of the present invention, computing device 205 may be simultaneously configured as both an HDMI source and an HDMI sink device to accept control commands received from other consumer electronic devices that are configured as HDMI source devices and output control commands to other consumer electronic devices that are configured as HDMI sink devices.

In step 600 HDMI software agent 250 or virtual USB 340 discovers any consumer electronic devices on the HDMI network, i.e., consumer electronic devices connected to computing device 205 via HDMI connection 206. In step 610 HDMI software agent 250 or virtual USB 340 determines the specific control capabilities, e.g., CEC channel controls, supported by each one of the consumer electronic devices discovered in step 600. For example, each consumer electronic device may use one or more of the user commands, e.g., play, fast-forward, skip, stop, and the like, specified by a standard, such as the CEC channel. In step 620 HDMI software agent 250 or virtual USB 340 enumerates a USB HID for each one of the consumer electronic devices. The enumerated HIDs provide a standardized method of communicating status and CEC channel controls for each control capability determined in step 610.

The consumer electronic devices appear to software applications as if the consumer electronic devices, e.g., HDMI sink 140 are USB devices connected directly to computing device 205 rather than as consumer electronic devices connected via an HDMI network. In step 630 one or more software applications running on computing device 205 interact with the consumer electronic devices using controls, e.g., CEC channel controls, that are specific to each consumer electronic device. Therefore, a user may control one or more of the HDMI networked devices or other computing devices (HDMI sources) through a single input device, e.g., remote control, provided by computing device 205. Alternatively, a user may control one or more of the HDMI networked consumer electronic devices or other computing devices (HDMI sources) through a graphical user interface displayed on display device 210. Furthermore, since consumer electronic devices are hot pluggable, HDMI software agent 250 and virtual USB 340 detect when a consumer electronic device is added or removed from HDMI system 100 or 150. Steps 600, 610, 620, and 630 are completed when a consumer electronic device is added and USB HIDs for removed consumer electronic devices are disabled.

The invention has been described above with reference to specific embodiments. Persons skilled in the art, however, will understand that various modifications and changes may be made thereto without departing from the broader spirit and scope of the invention as set forth in the appended claims. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. The foregoing description and drawings are, accordingly, to be regarded in an illustrative rather than a restrictive sense.

The invention claimed is:

1. A method for controlling a computing device using consumer electronic devices over a high definition multimedia interface (HDMI) network, comprising:

reporting one or more consumer electronics control command capabilities of the computing device to the consumer electronic devices coupled to the computing device over the HDMI network;

receiving a consumer electronics control command from a first consumer electronic device over the HDMI network;

storing the consumer electronics control command in a buffer associated with an HDMI controller;

translating the stored consumer electronics control command into a universal serial bus (USB) human interface device (HID) report;

storing the translated USB HID report in a USB stack; and processing the USB HID report stored in the USB stack to execute the consumer electronics control command.

2. The method of claim 1, wherein an additional computing device that is configured as a HDMI source device is coupled to the HDMI network.

3. The method of claim 2, further comprising the steps of:

determining additional computing device control capabilities of the consumer electronic devices and the computing device;

enumerating the additional computing device by using a USB HID that is configured to represent the control capabilities of the computing device; and transmitting a control command from the additional computing device to the computing device over the HDMI network to control the computing device.

4. The method of claim 1, wherein a single wireless remote control is used to allow a user to interface with the first consumer electronic device to control the computing device over the HDMI network.

5. The method of claim 1, wherein a graphical user interface is presented on a display device of the first consumer electronic device to allow a user to control the computing device over the HDMI network.

6. The method of claim 1, wherein the consumer electronic devices implement a consumer electronic control (CEO) channel specified by HDMI 1.2a.

7. The method of claim 1, wherein the computing device is configured to receive device controlling signals and at least one of audio data, visual data, and multimedia data.

8. The method of claim 1, wherein the computing device is configured as a HDMI source device and further comprising the steps of:
discovering the consumer electronic devices that are coupled to the HDMI network to produce discovered consumer electronic devices;
determining control capabilities of each discovered consumer electronic device; and
enumerating each discovered consumer electronic device as a universal serial bus (USB) human interface device (HID) configured to represent the control capabilities in order to allow a user to control the discovered consumer electronic devices over the HDMI network from the computing device.

9. The method of claim 1, further comprising the step of reporting a consumer electronics device that is directly coupled to the computing device as an HDMI sink device to the consumer electronic devices coupled to the computing device over the HDMI network to allow a user to control the electronics device that is directly coupled to the computing device over the HDMI network.

10. A non-transitory computer readable medium storing instructions that, when executed by a processor, cause the processor to enable a computing device to be controlled by consumer electronic devices over a high definition multimedia interface (HDMI) network, by performing the steps of:
reporting one or more consumer electronics control command capabilities of the computing device to the consumer electronic devices coupled to the computing device over the HDMI network;
receiving a consumer electronics control command from a first consumer electronic device over the HDMI network;
storing the consumer electronics control command in a buffer associated with an HDMI controller;
translating the stored consumer electronics control command into a universal serial bus (USB) human interface device (HID) report;
storing the translated USB HID report in a USB stack; and
processing the USB HID report stored in the USB stack to execute the consumer electronics control command.

11. The non-transitory computer readable medium of claim 10, wherein the consumer electronic devices implement a consumer electronic control (CEC) channel specified by HDMI 1.2a.

12. A computing device configured to be controlled by a consumer electronic device over a high definition multimedia interface (HDMI) network, the computing device comprising:
an HDMI controller that is coupled to the HDMI network and configured to receive control commands from the consumer electronic device; and
an agent configured to:
report one or more consumer electronics control command capabilities of the computing device to the consumer electronic devices coupled to the computing device over the HDMI network;
receive a consumer electronics control command from a first consumer electronic device over the HDMI network;
store the consumer electronics control command in a buffer associated with the HDMI controller;
translate the stored consumer electronics control command into a universal serial bus (USB) human interface device (HID) report;
store the translated USB HID report in a USB stack; and
process the USB HID report stored in the USB stack to execute the consumer electronics control command.

13. The system of claim 12, wherein the computing device further comprises a system memory configured to store the agent and a USB stack, and the agent is a software program configured to interface between the USB stack and the HDMI controller.

14. The system of claim 12, wherein the computing device further comprises a USB controller, and the agent is a virtual USB device that is coupled to the USB controller and configured to interface between the USB controller and the HDMI controller.

15. The system of claim 12, further comprising an additional computing device that is coupled to the HDMI network and configured as a HDMI source device to:
determine the control capabilities of the computing device reporting as consumer electronic device sink; and
enumerating the additional computing device as a USB HID that is configured to represent the control capabilities of the computing device reporting as consumer electronic device sink.

16. The system of claim 12, wherein the computing device is configured as a HDMI sink device.

17. The system of claim 12, wherein the consumer electronic device comprises a single wireless remote control configured to allow a user to interface with the consumer electronic device to control the computing device and any other consumer electronic devices that are coupled to the HDMI network.

18. The system of claim 12, wherein the consumer electronic device comprises a display device that is configured to present a graphical user interface to allow a user to control the computing device and any other consumer electronic devices that are coupled to the HDMI network.

19. The system of claim 12, wherein the consumer electronic device implements a consumer electronic control (CEO) channel specified by HDMI 1.2a.

20. The system of claim 12, wherein the computing device is further configured to receive device controlling signals and at least one of audio data, visual data, and multimedia data.

* * * * *

UNITED STATES PATENT AND TRADEMARK OFFICE
CERTIFICATE OF CORRECTION

| | |
|---|---|
| PATENT NO. | : 8,990,437 B2 |
| APPLICATION NO. | : 11/939521 |
| DATED | : March 24, 2015 |
| INVENTOR(S) | : Mark A. Overby and Robert William Chapman |

It is certified that error appears in the above-identified patent and that said Letters Patent is hereby corrected as shown below:

Claims:

Column 9, Claim 6, Line 13, please delete "(CEO)" and insert --(CEC)--.
Column 10, Claim 19, Line 58, please delete "(CEO)" and insert --(CEC)--.

Signed and Sealed this
First Day of December, 2015

Michelle K. Lee
*Director of the United States Patent and Trademark Office*